United States Patent [19]
Wick et al.

[11] 4,128,323
[45] Dec. 5, 1978

[54] CAMERA WITH IMPROVED FILM-TRANSPORT ACTUATION

[75] Inventors: Richard Wick; Otto Stemme, both of Munich; Peter Lermann, Narring; Günter Fauth, Unterhaching, all of Fed. Rep. of Germany

[73] Assignee: Agfa-Gevaert AG, Leverkusen, Fed. Rep. of Germany

[21] Appl. No.: 796,722

[22] Filed: May 13, 1977

[30] Foreign Application Priority Data
May 19, 1976 [DE] Fed. Rep. of Germany ....... 2622372

[51] Int. Cl.² .............................................. G03B 17/50
[52] U.S. Cl. ..................................... 354/86; 354/187; 354/204
[58] Field of Search ..................................... 354/83–86, 354/187, 192–194, 204, 208, 212, 219, 288

[56] References Cited
U.S. PATENT DOCUMENTS

| 1,110,116 | 9/1914 | Dietz | 354/208 |
|---|---|---|---|
| 1,251,654 | 1/1918 | Greene | 354/208 |
| 2,854,906 | 10/1958 | Lachmann | 354/204 |
| 3,677,160 | 7/1972 | Harvey | 354/83 |
| 3,906,521 | 9/1975 | Ueda | 354/86 |

FOREIGN PATENT DOCUMENTS

| 898112 | 11/1953 | Fed. Rep. of Germany | 354/187 |
|---|---|---|---|
| 563523 | 8/1944 | United Kingdom | 354/204 |

*Primary Examiner*—John Gonzales
*Attorney, Agent, or Firm*—Michael J. Striker

[57] ABSTRACT

The camera has a housing and a lens. A film transport mechanism is arranged in the housing. An operating element includes a member which is displaceable by a user in longitudinal direction of the optical axis of the lens and which, during at least part of such displacement, actuates the film transport mechanism. The operating element may include two of these members; if so, they are located at opposite lateral sides of the lens and are coupled so as to move in unison.

7 Claims, 12 Drawing Figures

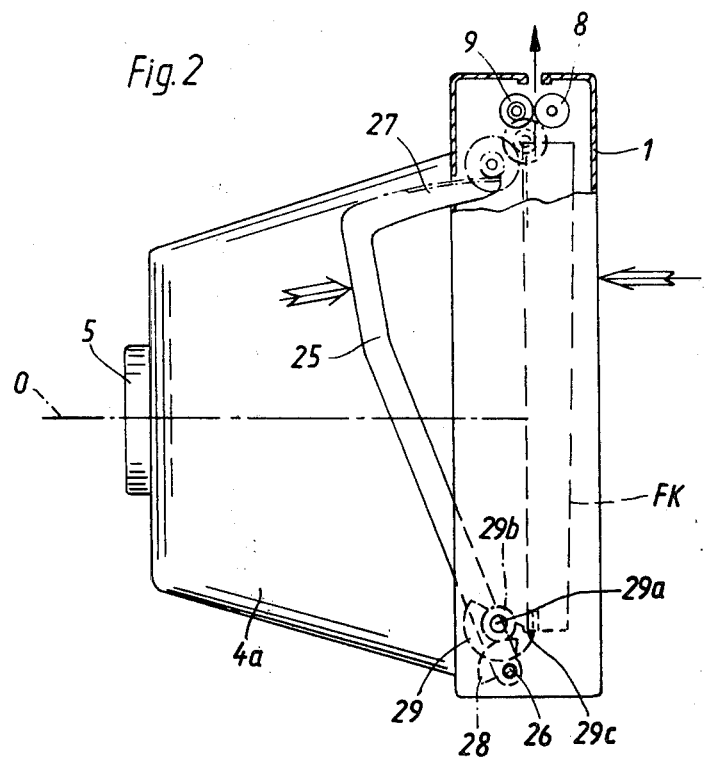
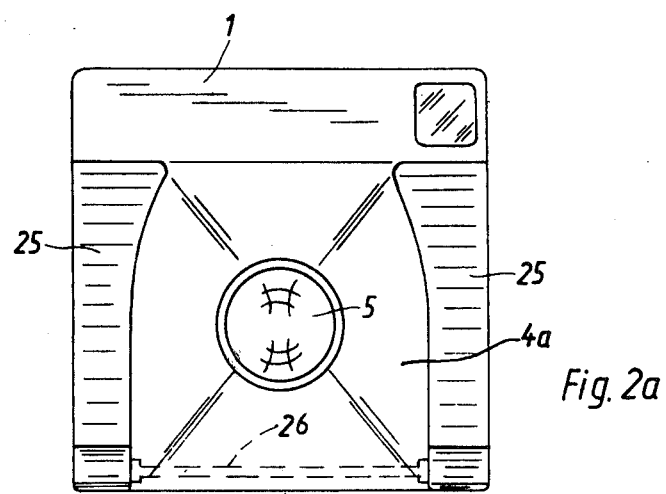

CAMERA WITH IMPROVED FILM-TRANSPORT ACTUATION

BACKGROUND OF THE INVENTION

The present invention relates to cameras, and more particularly to a camera having improved film-transport actuation.

To advance film in a camera the user must operate an actuating element which causes the desired film advancement. Many proposals have been made in this respect. For example, it is known to provide knobs which are turned or slides which must be pushed or pulled. Other proposals include levers which are pivoted to effect rapid film transportation and, especially in the case of the larger roll film cameras, cranks which are turned. Still further prior-art proposals include rods or complete housing parts which are displaced with reference to the camera housing to transport the film, or rings which surround the lens and must be turned to effect film transportation. According to a proposal for a camera which uses film packs containing a number of film sheets, a tag of the respective film sheet extends from the camera and must be pulled to effect film-sheet transportation.

The particular structures of these prior proposals differ widely from one another. However, all of these proposals have one common denominator: the movement which must be performed to effect film transportation is always in a direction normal to, or circumferentially of, the optical axis of the camera lens.

In many instances this is not objectionable because the force required to effect such movement (and hence to transport the film) is often quite small. However, in some types of camera this force is much higher. For example, in the so-called instant-picture cameras the film sheets are relatively large and require a higher-than-usual force to transport them. More importantly, during the transportation of these film sheets a paste-like developer must be uniformly spread over the entire picture area of the film sheet; therefore, the transportation force must be sufficiently high to effect such spreading which usually occurs as the film sheet is moved through the nip between two spreading rollers.

In the prior-art cameras such higher forces are difficult for a user to produce, because a force which must act normal to or circumferentially of the optical axis is not easy to generate. Moreover, in the prior-art proposals the user must change his grip on the camera when he has completed an exposure and now operates the arrangement (button, lever, slide, and the like) which activates the film transport mechanism.

Cameras for large-format film, and instant-picture cameras, seek to overcome the force-application problem by either providing the earlier-mentioned pull-out tags or providing a mechanical (e.g. cranks, slides) or motorized drive for the film-transporting mechanisms. They still require, however, that the user change his grip on the camera in order to actuate this mechanism.

SUMMARY OF THE INVENTION

It is an object of the invention to overcome the drawbacks of the prior art.

A more particular object of the invention is to provide an improved operating arrangement for actuating a film-transporting mechanism of a camera.

Another object is to provide such an improved operating arrangement which enables the user to manually produce the requisite film-transporting force in all types of cameras, even in instant-picture cameras.

Still a further object is to provide an arrangement of the type under discussion which does not require the user to change his grip on the camera in order to operate the arrangement.

An additional object of the invention is to provide such an arrangement which is simple to operate and simple to construct.

In pursuance of these objects, and of others which will become apparent hereafter, one aspect of the invention resides in a camera that is provided with a housing and with a lens having an optical axis. Briefly stated, the camera may comprise transporting means actuatable for transporting a film with reference to the housing, and operating means — including an operating element that is displaceable relative to the housing in direction lengthwise of the optical axis — for actuating the transporting means.

The housing of most cameras has a more or less flat back which faces towards the user when the camera is in operation. It is conventional — and indeed the only natural — practice to so grip the camera that the thumbs of both hands rest against this back while the other fingers of each hand — except at times the index finger of one (usually the right) hand which operates the shutter release — rest against the front of the housing. With the camera according to the present invention the user need not change this grip which he has on the camera. He merely exerts a squeezing action between the thumb and the remaining fingers of each hand, thereby exerting a force which (unlike the prior art) acts in longitudinal direction of the optical axis (parallel or substantially parallel to the same). The force which can be so exerted in substantial but does not impose a strain on the user, so that he can actuate the film-transporting mechanism of the camera even if a relatively large force is required for this purpose, e.g. in large-format and/or instant-picture cameras.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a somewhat diagrammatic, partly sectioned side elevational view of a camera incorporating a further embodiment of the invention;

FIG. 2a is a front view of the camera in FIG. 2;

DESCRIPTION OF THE PREFERRED EMBODIMENTS

Figure 1:
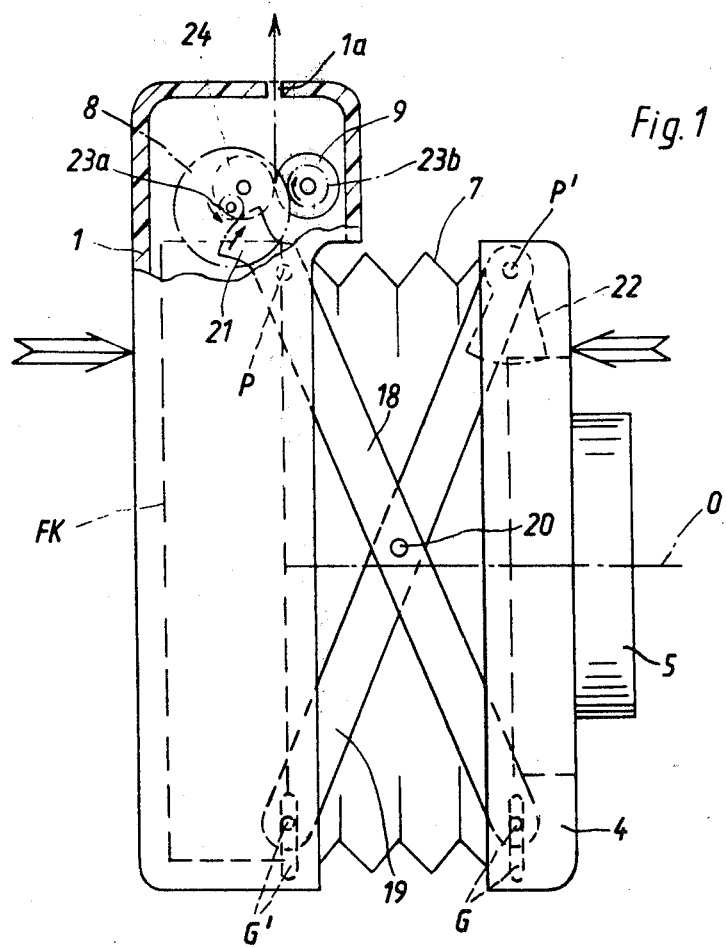
FIG. 1 is a somewhat diagrammatic, partly sectioned side elevational view showing a camera incorporating one embodiment of the invention.
Figure 1A:
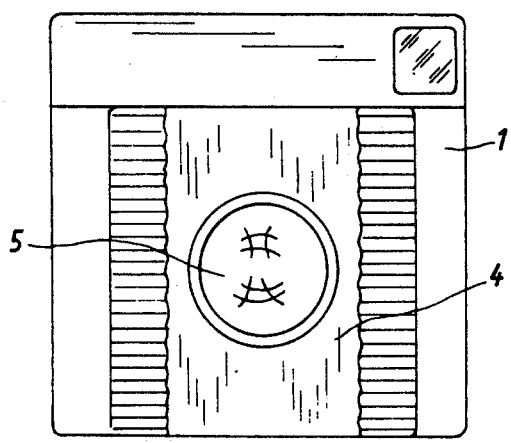
FIG. 1a is a front view of the camera in FIG. 1.
Figure 1B:
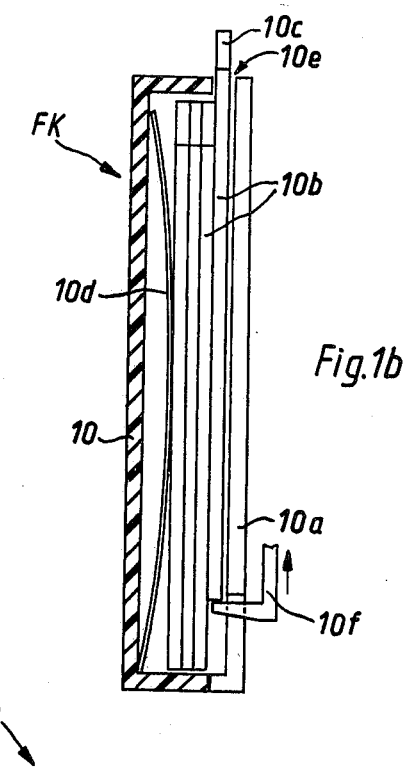
FIG. 1b is a vertical section through a film pack for use in the camera of FIG. 1.
Figure 1C:
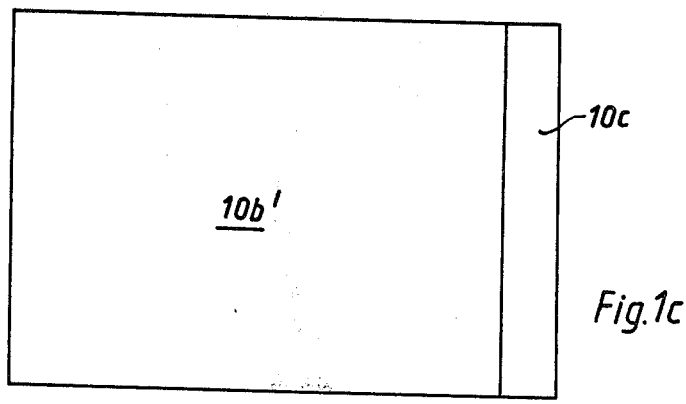
FIG. 1c is a top plan view of one of the film sheets in the film pack of FIG. 1b.

A first embodiment of the invention is illustrated in FIGS. 1 and 1a. By way of example the invention is shown in this and in all other embodiments in the context of an instant-picture camera; it should be understood, however, that the invention is not by any means limited to this type of camera. In view of the exemplary illustration of the invention on hand of instant-picture cameras, FIGS. 1b and 1c show details of a film cassette (and of the film sheets in such a cassette) which can be used in instant-picture cameras. The cassette does not form part of the invention; it is shown only to facilitate an understanding of the reasons why higher-than-usual forces are required to operate the film transporting mechanism in instant-picture cameras.

The camera of FIGS. 1 and 1a has a housing 1 which can accommodate a film pack cassette FK. As FIGS. 1b and 1c show, such a cassette has a casing 10 provided at one side with an opening 10a in which a gripper (e.g. hook) 10f of the camera film transporting mechanism moves (up and down in FIG. 1b). In the interior of casing 10 are located several film sheets 10b which are pressed towards the opening 10a by a spring 10d. When gripper 10f is in its lowermost position relative to the cassette FK (which will be installed upright in the camera housing 1), it engages below that film sheet 10b which is closest to the opening 10a and during upward movement expels this film sheet 10b through an outlet slot 10e in an upper end wall of casing 10.

The film sheets 10b have a picture area 10b' (FIG. 1c) where the picture appears after the film sheet has been exposed. To obtain the picture it is, of course, necessary to apply a developer as uniformly as possible over the picture area 10b'. For this purpose each film sheet 10c is provided adjacent that end which emerges first from the slot 10e, with a pouch-like portion 10c containing the developer paste.

When the film sheet 10b is expelled through the slot 10e it enters into the nip between two cooperating rollers 8, 9. These constitute part of the film transporting mechanism; they grip the film sheet 10b and draw it out of slot 10e to expel it from the camera housing through another slot 1a. In addition, however, the rollers 8 and 9 also serve to spread the developer over the picture area 10b'. For this purpose they must squeeze the developer paste out of the pouch portion 10c and then lspread it over the area 10b' as the film sheet 10b passes between them. It is because of this action that instant-picture cameras require relatively high film-transporting forces.

The camera in FIGS. 1 and 1a has a lens mount 4 which carries the lens 5 and the not-illustrated shutter of the camera. A bellows 7 (known per se) is secured to the lens mount 4 and the camera housing 1 to prevent the entry of light. Mount 4 is connected to housing 1 by means of a scissors-type linkage (analogous to lazy tongs) having two bars 18, 19 which are pivoted to one another at 20. This linkage is located to one lateral side of the lens 5; to avoid skewing of — and damage to — respective camera components it is advantageous if a similar linkage connects mount 4 and housing 1 at the other lateral side of the lens 5 also.

The lower end of bar 18 is slidably connected to mount 4 by a pin-and-slot guide G; the lower end of bar 19 is connected by a similar guide G' to the housing 1. The upper end of bar 18 is pivoted to the housing 1 at the pivot P and is provided (integrally or otherwise) with a gear segment 21 which pivots with the bar 18 about the pivot P. This gear segment meshes with a pinion 23a which in turn meshes with a gear 24 that drives a further pinion 23b at the end of roller 9 (e.g. on a shaft thereof), so that pivoting of gear segment 21 in clockwise direction (during movement of mount 4 towards the housing 1) results in rotation of roller 9. The roller 8 need not be separately driven. It goes without saying, of course, that it could be the roller 8 which is driven instead of the roller 9, or that they could both be driven if desired.

The upper end of bar 19 is pivoted at P' to the mount 4. It also carries a gear segment 22 which pivots with bar 9 about pivot P'; this segment 22 acts (not illustrated) upon a movable component which in turn cocks the shutter of the camera in response to the pivoting of segment 22. The cocking may take place while the mount moves either toward or away from the housing 1; a system for transmitting cocking motion from such a segment to the shutter is already known per se.

The bars 18 and/or 19 are advantageously either themselves able to bias the mount 4 to the illustrated position, or are so spring-loaded that this result is obtained. Thus the mount 4 will automatically move to its operative position (illustrated) when a (not-illustrated) latch of the camera is released.

When the camera is in the position shown in FIG. 1 and the shutter has been operated to expose a film sheet, the user merely squeezes his thumbs towards the other fingers of his hands, and vice versa, as indicated by the arrows. This causes the mount 4 to be displaced towards the housing 1 whereby the roller 9 is turned via segment 21 and, in cooperation with roller 8, transports the exposed film sheet out of the cassette FK to expel it from housing slot 1a.

If the linkages 18, 19 are provided at both lateral sides of the lens 5, they are advantageously connected with one another to increase the stability of the arrangement, especially against skewing. The pivots P and P' could for this purpose be throughgoing shafts, or other (or additional) couplings could be provided. The roller 9 itself might be used to perform this function.

It is self-evident that the invention will equally well apply to cameras which are not of the instant-picture type. For example, a camera using roll film could have a film take-up spool which would be rotated instead of the roller 9 so as to advance the roll film by a certain length (e.g. the length of a film frame) whenever the mount 4 is moved towards the housing 1. The roller 8 would then be omitted.

In the embodiment of FIGS. 2 and 2a the lens mount 4a is a rigid, generally tubular member which mounts the lens 5 but does not have any film-transporting function. Instead, the camera in this embodiment is provided with an arm 25 which is located at one lateral side of lens 5 and mount 4a (another similar arm could be located at the opposite lateral side). The arm 25 is turnable on pivot shaft 26 (if two of the arms are provided they may both turn on the same pivot) of housing 1 and is biased (not shown) so that it permanently tends to assume the position shown in FIG. 2. The upper portion of arm 25 is provided with a rack portion 27 which is curved on a radius concentric with the pivot 26 and the teeth of which mesh with a pinion on roller 8 or 9 (or with intermediate gears which transmit motion to such pinion). Therefore, the application of pressure on arm 25 towards the housing 1, and on the housing 1 towards the arm (see the arrows) causes the arm 25 to turn (clockwise in FIG. 2) about the pivot 26 and to drive the film transporting mechanism.

A gear segment 28 is turnable with the arm 25 about the pivot 26. It meshes with a pinion 29b which is connected to a further segment 29 to turn with the same. Rotation of pinion 29b by segment 28 therefore results in turning of segment 29. The periphery of the latter is formed with an entraining portion 29c. Turning of arm 25 in clockwise direction thus results in upward movement of the portion 29c (i.e. in anti-clockwise direction); during this movement the portion 29c performs the same function as the gripper 10f in FIG. 1b, i.e. it moves the exposed film sheet upwardly so that it can be gripped by rollers 8, 9 and transported by them. The teeth on the cooperating members must, of course, be so chosen that the portion 29c performs its entire travel distance (upwardly) while the arm 25 is still in the first stage of its clockwise turn, so that there is sufficient time for the rollers 8, 9 to perform (e.g. several) additional revolutions (to expel the film sheet from the camera) during the remaining portion of the clockwise turn of the arm 25. Although the arm 25 with its associated elements is duplicated (one arm being located at each lateral side of lens 5 as seen in FIG. 2a), only a single portion 29c and drive for the same need be provided.

Figure 3:
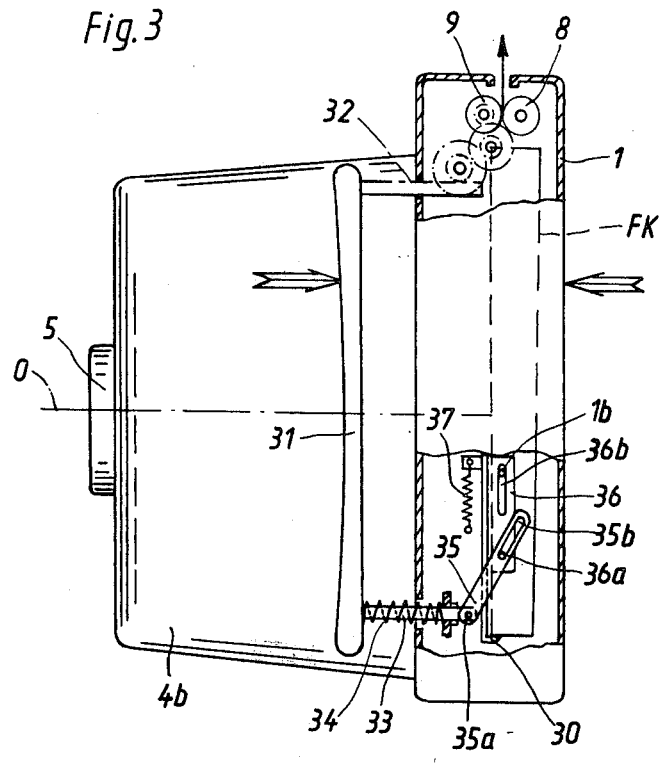
FIG. 3 is a view similar to FIG. 2 but showing another embodiment.
Figure 3A:
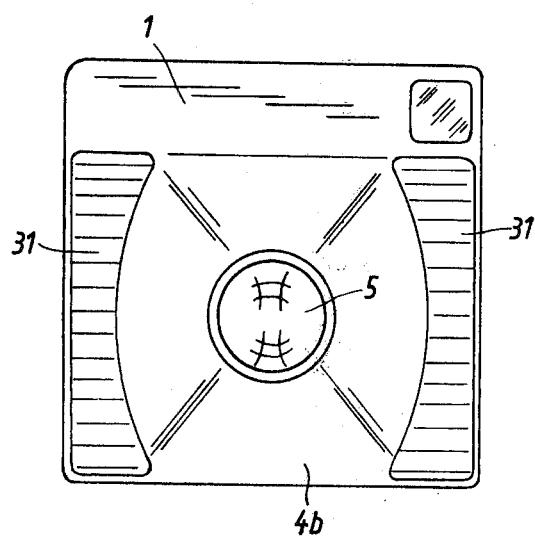
FIG. 3a is a front view of the camera in FIG. 3.

The FIGS. 3 and 3a show an embodiment wherein like reference numerals again identify elements corresponding to those in the preceding Figures. Here the lens mount 4b is also a rigid, generally tubular element and again two arms 31 are located at opposite lateral sides of lens 5 (one of these arms could be omitted). The arms 31 are, however, not pivotably movable; instead, they are mounted for translatory movement in parallelism with the optical axis O. Each arm 31 is guided in the housing 1 by an upper rod 32 and a lower rod 33. The upper rod is a toothed rack which meshes with the gears for driving the roller 9 and/or 8. The lower rod 33 is surrounded by a helical spring 34 bearing upon a stationary abutment and upon the rod 33 (or the arm 31) to bias the arm 31 outwardly away from the housing 1, to the position shown in FIG. 1.

The inner end of rod 33 carries a link 35 which is pivoted to it at 35a and provided with a slot 35b into which a pin 36a of a gripper carrier 36 slidably extends. The carrier 36 has mounted on it a gripper 30 (which corresponds, e.g. to gripper 10f of FIG. 1b). Carrier 36 is itself provided with a slot 36b into which a stationary pin 1b (e.g. provided on the housing 1) extends. Displacement of arm 31 and rod 33 towards housing 1 (i.e. rightwards in FIG. 3) causes the link 35 to pivot about 35a and, with pin 36a abutting the lower end of slot 35b, the carrier 36 and the gripper 30 are moved upwardly through a distance which is sufficient for the gripper 30 to push a film sheet 10b in cassette FK far enough upwards to be engaged in the nip of rollers 8, 9 (compare FIG. 1b). During the further rightward movement of rod 33 the gripper 30 is urged downwardly by the spring 37; slot 35b permits this further rightward movement of rod 33. When the rod 33 returns to the position shown in FIG. 3 as pressure on arm 31 is released, a (not-illustrated) detent, such as a pawl or the like, prevents renewed upwards displacement of the carrier 36 and gripper 30, so as to avoid undesired (and untimely) upward shifting of the next film sheet.

The arms 31 are curved about the generally tubular (conical) lens mount 4b, in order to offer a better grip to the user.

Figure 4:
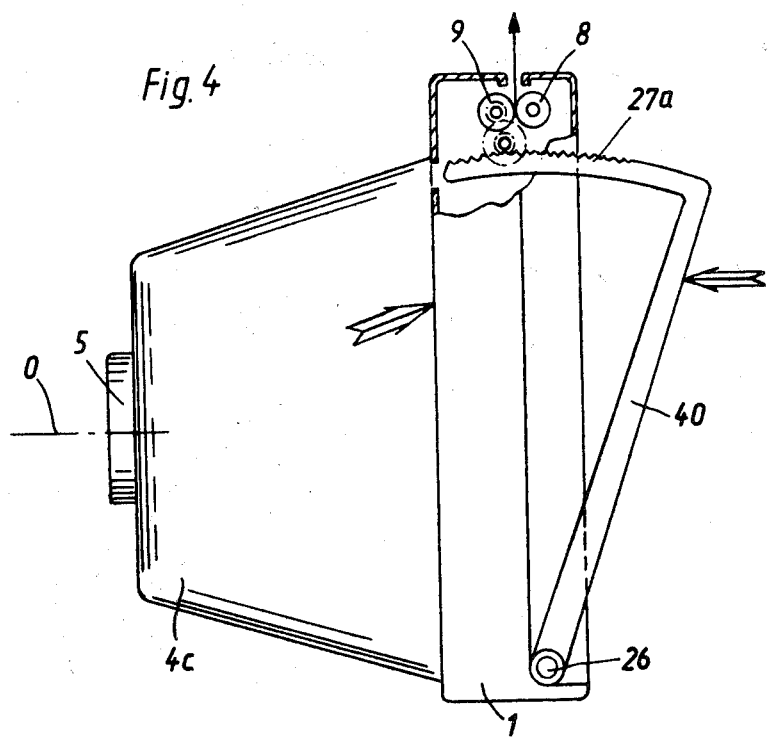
FIG. 4 is a view analogous to FIG. 2 but showing yet another embodiment.
Figure 4A:
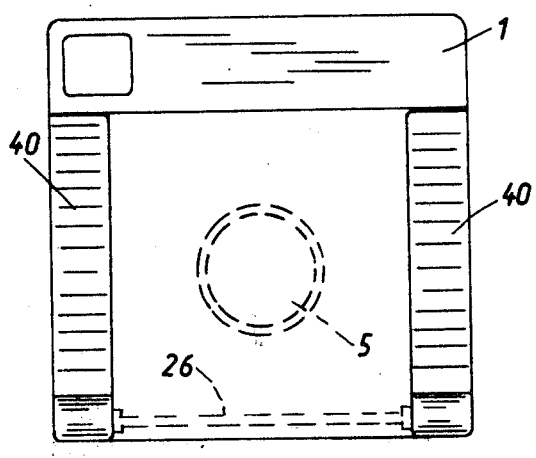
FIG. 4a is a rear view of the camera in FIG. 4.

The embodiment in FIGS. 4 and 4a (the latter is a rear view of the camera in FIG. 4) is reminiscent of the one in FIG. 2. The arms 40 are here located at the rear of housing 1, instead of at the front but again at opposite sides of the lens 5 which is mounted on lens mount 4c. Their operation is analogous to the operation described with reference to FIG. 2; rack 27a corresponds to the rack 27 in FIG. 2.

Figure 5:
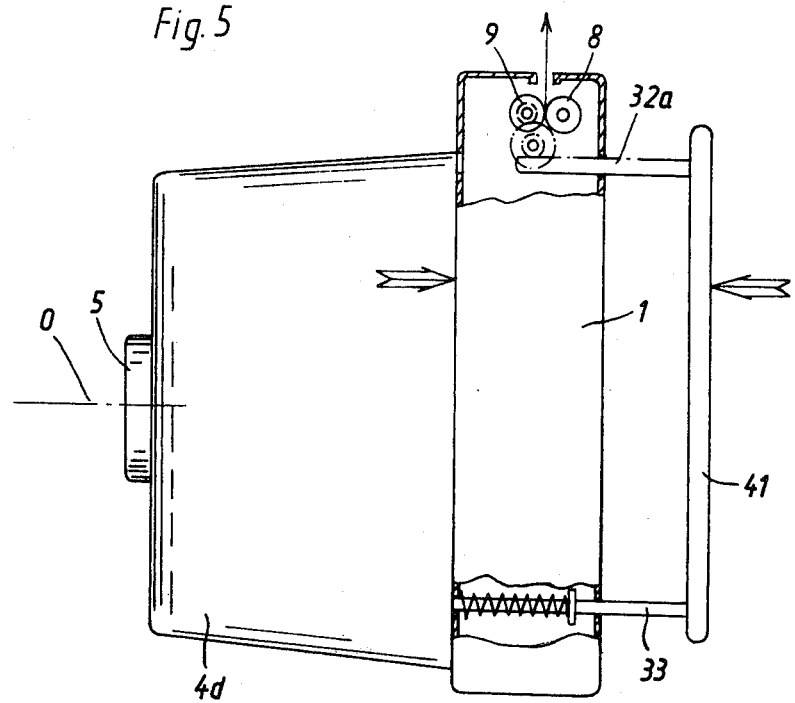
FIG. 5 is a view analogous to FIG. 3 but illustrating still an additional embodiment of the invention.
Figure 5A:
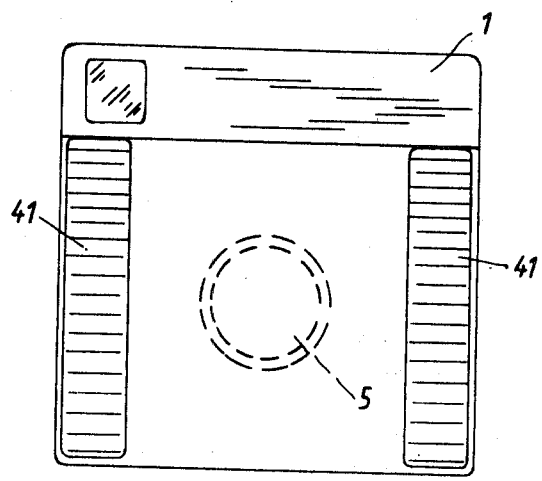
FIG. 5a is a rear view of the camera shown in FIG. 5.

FIGS. 5 and 5a, finally, show an embodiment which is analogous to the one described and shown with reference to FIG. 3, except that the arms 41 (located at opposite sides of the lens 5 on mount 4d) are here located at the rear of housing 1. Of course, since in FIGS. 4 and 5 the direction of movement of the racks 27a and 32a is the opposite from the movement of the similar elements in FIGS. 2 and 3, respectively, care must be taken that they rotate the rollers 9 and/or 8 in the requisite sense, i.e. in a direction in which these rollers grip the film sheets 10b (FIG. 1b) and expel them through slot 1a.

When the cameras in FIGS. 4 and 5 are ready for operation, the arms 40 and 41 project rearwardly from the respective housing 1, which may interfere with the use of the viewfinder. This is overcome by either relocating the viewfinder to a position where it will be accessible, or by providing a latch (not shown) which holds the arms 40, 41 in a position in which they are close to or abut the rear side of housing 1. This latch is released only after the viewfinder has been used and the exposure made, whereupon the arms are biased by their associated springs to the illustrated operating positions, in readiness for film transportation.

The disclosed invention is susceptible of various modifications. As mentioned before, it is by no means limited to instant-picture cameras. It will be obvious to those skilled in the art that the disclosed embodiments can readily be modified so that the film transport mechanism advances roll film by the length of one film frame during each operation of the respective arms, instead of transporting the instant-picture film sheets. A film take-up spool could be provided for rotation about either a vertical or a longitudinal axis, and a bevel gear could be employed to transmit rotary motion to such a spool from the respective gear segment or rack.

When two arms are provided at opposite sides of the lens 5, especially in the embodiments of FIGS. 4 and 5, they could be connected (for greater stability and/or to assure movement in unison) by a transverse bar, rod, bracket or plate located outside the housing 1. In FIGS. 3 and 5 a single arm 31 or 41 could be provided, but the two racks 32 or 32a could still be utilized by connecting the rack which is carried by the single arm 31 or 41 via a horizontal bracket with the other rack.

While the invention has been illustrated and described as embodied in an instant-picture camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a camera provided with a housing and with a lens having an optical axis, a combination comprising transporting means actuatable for transporting a film with reference to the housing; operating means, including a member carrying said lens, a scissor-type linkage mounting said member on said housing for movement relative thereto lengthwise of the optical axis and for actuating said transporting means during such movement of said linkage, comprising two bars which cross and are pivoted to each other, one of said bars having one end pivoted to said member and the other of said bars having one end pivoted to said housing; and a pair of gear segments, each connected to one of said ends and pivotable with the respective bar for actuating said transporting means and cocking a shutter of the camera, respectively.

2. A combination as defined in claim 1, wherein said member is movable in substantial parallelism with said optical axis.

3. A combination as defined in claim 1, wherein said member is movable in direction toward said housing for thereby actuating said transporting means, said operating means further comprising biasing means biasing said member in direction away from said housing.

4. A combination as defined in claim 1, wherein said camera is an instant-picture camera and said transporting means comprises a pair of film-transporting nip rollers, said operating means driving at least one of said nip rollers in rotation.

5. A combination as defined in claim 4, wherein said housing has a normally upper part bounded by an upper wall which is provided with a picture discharge slot, said rollers being mounted in said upper part below said slot.

6. A combination as defined in claim 1; and further comprising connecting means connecting said lens mount with said housing, and excluding the entry of light during said movement of the lens mount.

7. A combination as defined in claim 1, wherein said lens mount is movable towards and away from said housing, and said transporting means is actuated during movement of the lens mount towards the housing.

* * * * *